US011949935B2

(12) United States Patent
Murphy et al.

(10) Patent No.: US 11,949,935 B2
(45) Date of Patent: Apr. 2, 2024

(54) METHODS AND APPARATUS FOR NETWORK-BASED MONITORING AND SERVING OF MEDIA TO IN-VEHICLE OCCUPANTS

(71) Applicant: The Nielsen Company (US), LLC, New York, NY (US)

(72) Inventors: Edward Murphy, North Stonington, CT (US); Kelly Dixon, Sykesville, MD (US); Jennifer Carton, Ellicott City, MD (US); Francis C. Fasinski, III, Columbia, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/886,487

(22) Filed: May 28, 2020

(65) Prior Publication Data
US 2021/0235141 A1    Jul. 29, 2021

Related U.S. Application Data

(60) Provisional application No. 62/965,036, filed on Jan. 23, 2020.

(51) Int. Cl.
*H04N 21/258* (2011.01)
*G06N 3/04* (2023.01)
*H04W 4/44* (2018.01)

(52) U.S. Cl.
CPC ......... *H04N 21/25883* (2013.01); *G06N 3/04* (2013.01); *H04N 21/25891* (2013.01); *H04W 4/44* (2018.02)

(58) Field of Classification Search
CPC ....... H04N 21/25883; H04N 21/25891; H04N 21/252; H04N 21/25841; H04N 21/2668;
(Continued)

(56) References Cited

U.S. PATENT DOCUMENTS

| 8,370,489 B2 | 2/2013 | Mazumdar et al. |
| 8,930,701 B2 | 1/2015 | Burbank et al. |

(Continued)

FOREIGN PATENT DOCUMENTS

| KR | 20140100152 | 8/2014 |
| KR | 20170011628 | 2/2017 |
| WO | 2018232600 | 12/2018 |

OTHER PUBLICATIONS

Candelo, Elena, "Marketing Innovations in the Automotive Industry: Meeting the Challenges of the Digital Age", published by Springer International Publishing on Apr. 9, 2019, pp. 183-184, 3 pages.

(Continued)

*Primary Examiner* — Nathan J Flynn
*Assistant Examiner* — Christine A Kurien

(57) ABSTRACT

Example methods, apparatus, systems, and articles of manufacture are disclosed for network-based monitoring and serving of media to in-vehicle occupants. An example method includes linking panelist data corresponding to media exposure to first telemetry data collected by a vehicle to create linked panelist-telemetry data; and training a neural network to estimate vehicle occupant demographics based on second telemetry data using a first subgroup of the linked panelist-telemetry data.

40 Claims, 8 Drawing Sheets

(58) Field of Classification Search
CPC ....... H04N 21/41422; H04N 21/44222; H04N 21/4666; G06N 3/04; G06N 3/08; G06N 3/0454; H04W 4/44; H04W 4/029
See application file for complete search history.

(56) References Cited

U.S. PATENT DOCUMENTS

| | | | |
|---|---|---|---|
| 9,225,845 | B2 | 12/2015 | Agarwal et al. |
| 9,258,409 | B1 | 2/2016 | Barfield, Jr. et al. |
| 9,661,402 | B2 | 5/2017 | Topchy et al. |
| 2002/0107027 | A1 | 8/2002 | ONeil |
| 2008/0243573 | A1 | 10/2008 | Nasser et al. |
| 2009/0276235 | A1 | 11/2009 | Benezra et al. |
| 2010/0293033 | A1 | 11/2010 | Hall et al. |
| 2010/0312369 | A1* | 12/2010 | Dollar, Jr. ............. G06F 16/686 707/E17.101 |
| 2011/0099142 | A1 | 4/2011 | Karjalainen et al. |
| 2012/0239471 | A1 | 9/2012 | Grimm et al. |
| 2014/0058666 | A1 | 2/2014 | Sheha et al. |
| 2014/0279021 | A1 | 9/2014 | MacNeille et al. |
| 2014/0310103 | A1 | 10/2014 | Ricci |
| 2015/0254719 | A1 | 9/2015 | Barfield, Jr. et al. |
| 2016/0075233 | A1 | 3/2016 | Chun |
| 2017/0279549 | A1* | 9/2017 | Kocheisen ........... H04H 20/106 |
| 2018/0150878 | A1 | 5/2018 | Mowatt et al. |
| 2018/0150880 | A1 | 5/2018 | O'Driscoll et al. |
| 2018/0189581 | A1* | 7/2018 | Turcot ................ G06V 10/454 |
| 2018/0265095 | A1 | 9/2018 | Joe et al. |
| 2018/0336573 | A1 | 11/2018 | Luff |
| 2019/0266484 | A1* | 8/2019 | Maluf ...................... G06N 3/08 |

OTHER PUBLICATIONS

International Searching Authority, "International Search Report and Written Opinion," issued in connection with PCT Application No. PCT/US2021/014403, dated May 4, 2021, 9 pages.

International Searching Authority, "International Preliminary Report on Patentability," issued in connection with PCT Application No. PCT/US2021/014403, dated Jul. 26, 2022, 5 pages.

European Patent Office, "Communication pursuant to Rules 161(2) and 162 EPC," issued in connection with Application No. 21744762. 2, dated Aug. 30, 2022, 3 pages.

* cited by examiner

300 →

Table 1 – Input Telemetry Data

| Vehicle ID | Trip Start Date/Time | Location | Phone ID |
|---|---|---|---|
| 111 | 1/1/20 12pm | New York, NY | a4bd85 |
| 222 | 1/1/20 1pm | Tuscon, AZ | fa490c |
| 333 | 1/1/20 2pm | Charlotte, NC | d30b1f |
| 444 | 1/1/20 3pm | Tampa, FL | 489acd |

Table 2 – Linked Panelist-Telemetry Data

| Vehicle ID | PPM HH ID | Panelist 1 | Panelist 2 |
|---|---|---|---|
| 111 | AAA | Female, 18 | Male, 22 |
| 222 | BBB | Female, 55 | None |
| 333 | CCC | Male, 33 | Male, 62 |
| 444 | DDD | Female, 28 | Female, 8 |

Table 3 – Model Output Data

| Vehicle ID | Female 6-17 | Male 6-17 | Female 18-49 | Male 18-49 | Female 50+ | Male 50+ |
|---|---|---|---|---|---|---|
| 111 | 0.01 | 0.05 | 0.89 | 0.90 | 0.43 | 0.38 |
| 222 | 0.90 | 0.92 | 0.54 | 0.63 | 0.97 | 0.88 |
| 333 | 0.15 | 0.22 | 0.10 | 0.85 | 0.73 | 0.08 |
| 444 | 0.56 | 0.68 | 0.55 | 0.75 | 0.43 | 0.20 |
| 555 | 0.13 | 0.98 | 0.49 | 0.01 | 0.01 | 0.01 |

FIG. 3C

400 — Table 4 – Input Telemetry Data

| Vehicle ID | Trip Start Date/Time | Location | Phone ID |
|---|---|---|---|
| 111 | 1/1/20 12pm | New York, NY | a4bd85 |
| 222 | 1/1/20 1pm | Tuscon, AZ | fa490c |
| 333 | 1/1/20 2pm | Charlotte, NC | d30b1f |
| 444 | 1/1/20 3pm | Tampa, FL | 489acd |

Table 5 – Linked Panelist-Telemetry Data

| Vehicle ID | PPM HH ID | Trip Start Date/Time | Occupant 1 | Occupant 2 |
|---|---|---|---|---|
| 111 | AAA | 1/1/20 12pm | Female, 18 | None |
| 222 | BBB | 1/1/20 1pm | Female, 55 | None |
| 333 | CCC | 1/1/20 2pm | Male, 33 | Male, 62 |
| 444 | DDD | 1/1/20 3pm | Female, 28 | None |

Table 6 – Model Output Data

| Vehicle ID | Trip Start Date/Time | Female 6-17 | Male 6-17 | Female 18-49 | Male 18-49 | Female 50+ | Male 50+ |
|---|---|---|---|---|---|---|---|
| 111 | 1/1/20 12pm | 0.01 | 0.05 | 0.89 | 0.90 | 0.43 | 0.38 |
| 222 | 1/1/20 1pm | 0.90 | 0.92 | 0.54 | 0.63 | 0.97 | 0.88 |
| 333 | 1/1/20 2pm | 0.15 | 0.22 | 0.10 | 0.85 | 0.73 | 0.08 |
| 444 | 1/1/20 3pm | 0.56 | 0.68 | 0.55 | 0.75 | 0.43 | 0.20 |
| 555 | 1/1/20 4pm | 0.13 | 0.98 | 0.49 | 0.01 | 0.01 | 0.01 |

FIG. 4C

METHODS AND APPARATUS FOR NETWORK-BASED MONITORING AND SERVING OF MEDIA TO IN-VEHICLE OCCUPANTS

This patent claims the benefit of U.S. Provisional Patent Application No. 62/965,036, filed Jan. 23, 2020, entitled "METHODS AND APPARATUS FOR NETWORK-BASED MONITORING AND SERVING OF MEDIA TO IN-VEHICLE OCCUPANTS." Priority to U.S. Provisional Patent Application No. 62/965,036 is claimed. The entirety of U.S. Provisional Patent Application No. 62/965,036 is incorporated herein by reference in its entirety.

FIELD OF THE DISCLOSURE

This disclosure relates generally to media audience measurement, and, more particularly, to methods and apparatus for network-based monitoring and serving of media to in-vehicle occupants.

BACKGROUND

In recent years, car manufacturers, working closely with various software application developers, have been improving the technology within vehicles. In-vehicle infotainment systems may have various music playing software or GPS software programmed into the vehicle itself.

Applications being developed for the software in vehicles are also present on many different mobile devices, such as smart phones and tablets. Some application users have a preference for the mobile phone application, some application users have a preference for the in-vehicle infotainment application, and some users may use both.

BRIEF DESCRIPTION OF THE DRAWINGS

FIG. 3A illustrates example telemetry input data corresponding to household demographics that may be used by the example audience monitor of FIG. 1 and/or 2.

FIG. 3B illustrates example linked panelist-telemetry data that may be generated by the example audience monitor of FIGS. 1 and/or 2.

FIG. 3C illustrates example demographic output data that may be generated by the example audience monitor of FIGS. 1 and/or 2.

FIG. 4A illustrates alternative example telemetry input data corresponding to an occupant at a particular time that may be used by the example audience monitor of FIG. 1 and/or 2.

FIG. 4B illustrates alternative example linked panelist-telemetry data that may be generated by the example audience monitor of FIGS. 1 and/or 2.

FIG. 4C illustrates alternative example demographic output data that may be generated by the example audience monitor of FIGS. 1 and/or 2.

The figures are not to scale. Instead, the sizes and/or proportions of structures may be enlarged in the drawings. In general, the same reference numbers will be used throughout the drawing(s) and accompanying written description to refer to the same or like parts.

Figure 1:
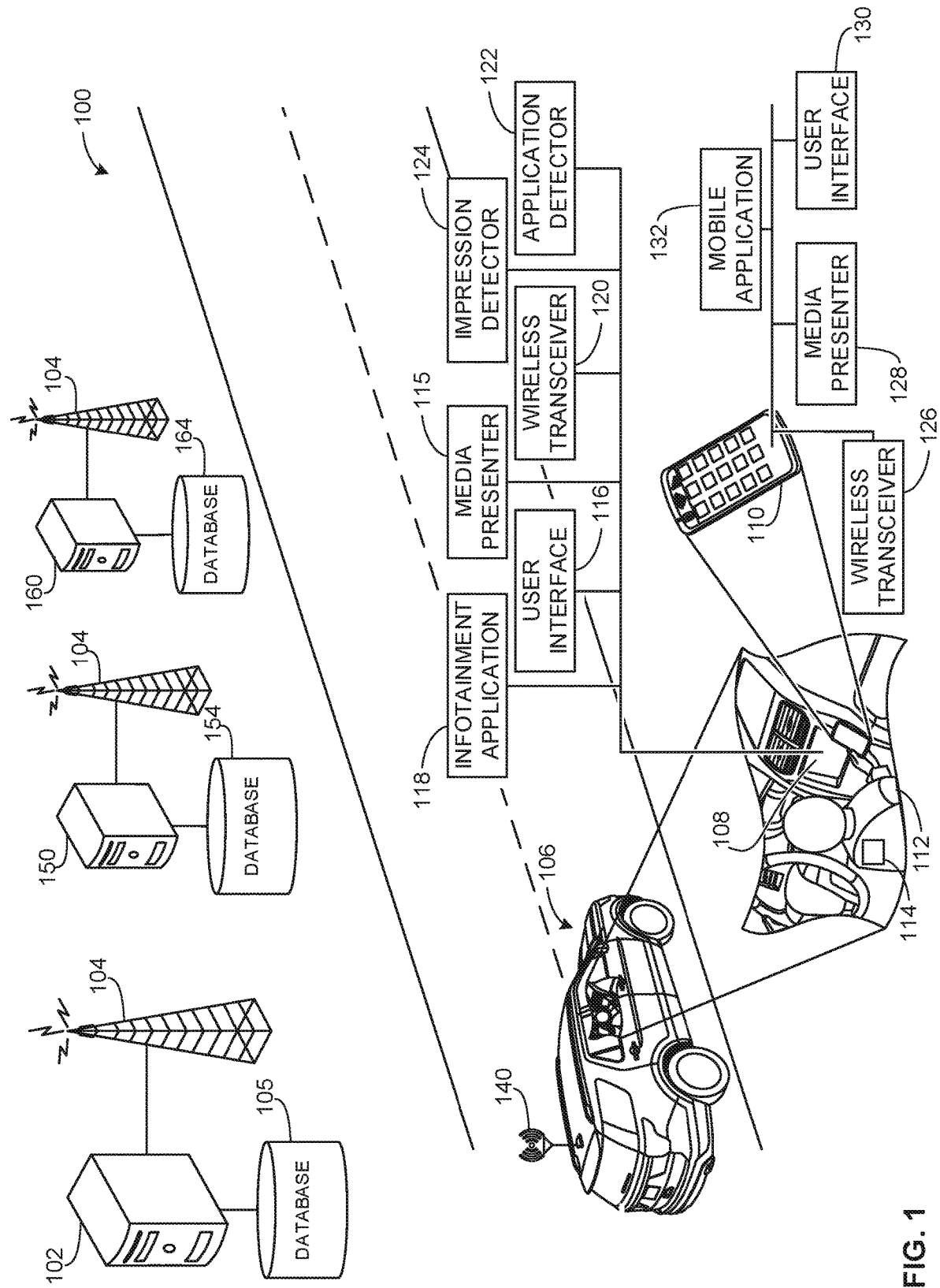
FIG. 1 is an example in-vehicle media interaction and monitoring system.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, vehicle manufacturers have increased the technological capabilities of their vehicles often marketed as connected cars. For example, these vehicles are provided with wireless communication capabilities and have sufficient computing power to provide in-vehicle network-based media delivery and media interaction services.

Among other functions, such as facilitating telephone calls and providing directions, these vehicles also often contain audio and visual media presenting applications, such as a music streaming service. In the past, a user wishing to listen to music in the car would need to have a compact disc (CD) or connect their mobile device to the Bluetooth system in the car. Now, the connected car system can stream music from the internet without needing to use the network connectivity of a mobile device. Additionally, vehicle manufacturers now include one or more processors capable of collecting telemetry data. Telemetry data is information logged by a device in a car and is indicative of vehicle operation and/or vehicle accessory uses by the driver and/or passengers of the vehicle. Telemetry data can be collected through sensor and/or other subsystems of the vehicle. The logged telemetry data can then be transmitted (e.g., wirelessly) or otherwise provided to a remote server (e.g., a server of an automobile manufacturer or a third-party that collects such data) for storing in a database.

Telemetry data may include vehicle location, vehicle speed, vehicle acceleration, vehicle breaking, vehicle steering, vehicle airbag status, vehicle window status, media data (e.g., which radio frequency is tuned or selected via by the infotainment system of the vehicle, which radio station is tuned by the radio of the vehicle, video and/or display information, streamline data, etc.) phone information (e.g., if paired or previously paired), Bluetooth information (e.g., for paired or previously paired devices), devices connected to the infotainment system (e.g., via a wired or wireless connection), phone identifier (e.g., if paired or previously paired), MAC address of infotainment system and/or connected (e.g., currently or previously) device(s), volume of audio and/or video content, audio and/or video type, time of day, week, month, year, etc., whether devices are connected wirelessly and/or via a port, indicators if the vehicle was on or off, video information displayed on a screen within the vehicle, type of vehicle (e.g., minivan, sports car, etc.), brand and/or model of vehicle, age of vehicle, details related to vehicle (e.g., engine type, implemented features, etc.), the driving mode (e.g., Eco, Normal, Sport, etc.), drive features (rear-wheel drive, all-wheel drive, front-wheel drive), limited slip differential status, suspension information, automatic breaking system (ABS) status, high beam status, external or internal lights status, cruise control status, autopilot status, seatbelt status, seat sensor status (e.g., passenger weight, whether there are passengers in the car above a threshold weight to differentiate between a person and a bag, etc.), internal temperature, internal humidity, external temperature, external humidity, air conditioning (AC) and/or heat status (e.g., AC/heat system status, heated seat status, heated wheel statue, etc.), windshield wiper status, gas tank status, engine revolutions per minute status, throttle position status, warning light status (e.g., check engine light, low air pressure light, etc., including the amount of time the lights have been on for), driver data sensed from steering wheel (e.g., pulse of driver, perspiration of driver, etc.), distance from other vehicles, voice recognition data, Wi-Fi and/or cellular status of vehicle, horn usage data, camera data, radar data, rear camera data, seat position data, battery status, door status (e.g., corresponding to when and which doors were opened and closed), use of turn signal, weight of vehicle, weight of items in vehicle; trunk; roof; attached to vehicle; center console; glove box; etc., and/or weight of items in drink holder(s), child lock status, sun roof position, auto parking feature status, route and/or destination from GPS, car seat status, etc. Additionally, in vehicles with more sophisticated sensors, the telemetry data may include data related to how the vehicle moves with respect to street signs, streetlights, other vehicles, pedestrians, animals, weather, etc., position and/or movement of vehicle within lane, lane change data, data related to the lane the vehicle is located in and/or changes to, amount of time waiting at a stop sign, stop light, etc., speed with respect to speed limit, driving patterns with respect to location (e.g., urban, suburban, rural, highway, dirt road, off road, street, parking lot, alley, etc.). The telemetry data may additionally include any data that can be sensed or determined (e.g., locally or at the service provider 150) by, or based on data obtained from, the infotainment system 108 of FIG. 1 or other processor(s) of the vehicle 106 of FIG. 1 and/or any other processor of the within and/or around the vehicle 106.

An infotainment system and/or other processor(s) in a vehicle provided by a service provider (e.g., a vehicle manufacturer) or purchased by a consumer to implement in a vehicle may contain processing capabilities to monitor, store, and transmit telemetry data back to the service provider, which can then aggregate and provide such telemetry data to an audience measurement entity (e.g., The Nielsen Company (US), LLC) to analyze media presentation activity, occupancy, and/or transportation activity.

Audience measurement entities seek to understand the composition of audiences of media, including passengers in vehicles that are exposed to media (e.g., via the infotainment system included in the vehicle and/or via mobile media devices in the vehicle, such as smart phones, tables, laptops, smart watches, etc.). Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration").

However, the telemetry data gathered by the service provider may not include demographic data (or other driver/passenger identification information) of occupants of the vehicle or may remove any vehicle, human, and/or other identification information from the telemetry data before sending to the audience measurement entity to protect the privacy and/or identities of the driver and/or passengers of the vehicle. Accordingly, telemetry data, alone, cannot be associated with specific viewers, demographics, etc. For example, when a person purchases a vehicle, the person may provide some demographic information to the automobile manufacturer and/or the infotainment manufacturer. Additionally, some demographics for the driver may be determined based on registration information. However, the provided or determined demographics of the owner of the vehicle may be limited, incomplete, and/or inaccurate. Additionally, the demographics of the driver may not match demographics of passengers and/or other drivers of the vehicle. For example, if the driver that registered with the vehicle is a fifty-year-old female, the demographics determined from the registration or the purchase of the vehicle will not reflect the demographics of other drivers of the vehicle or passengers of the vehicle. Additionally, demographic data based on the purchaser of the vehicle or the person who registered the vehicle may be inaccurate or dated. For example, the purchaser of the vehicle may rent his car out through a car-renting service or may loan the car to a friend or relative for a long period of time. Accordingly, examples disclosed herein utilize telemetry data to estimate the demographics of the driver and/or passengers of a vehicle and provide targeted media for the occupants (e.g., driver and/or passengers) based on the estimated demographics.

To associate demographics with the telemetry data, market researchers may perform audience measurements by enlisting a subset of the media consumers and/or vehicle passengers and/or drivers as panelists. Panelists or monitored panelists are audience members (e.g., household members, users, panelists, etc.) enlisted to be monitored, who divulge, share, and/or otherwise allow monitoring of their media activity and/or demographic data (e.g., race, age, income, home location, education level, gender, etc.) to facilitate a market research study. An audience measurement entity typically monitors media presentation activity (e.g., viewing, listening, etc.) of the monitored panelists via audience measurement system(s), such as a metering device(s), a portable people meter (PPM) (also known as portable metering devices and portable personal meters), and/or a local people meter (LPM). Audience measurement typically includes determining the identity of the media being presented on a media output device (e.g., a television, a radio, a computer, etc.), determining data related to the media (e.g., presentation duration data, timestamps, radio data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

A PPM is an electronic device that is typically worn (e.g., clipped to a belt or other apparel) or carried by a panelist (e.g., an audience member) and configured to monitor media consumption (e.g., viewing and/or listening activities) using any of a variety of media monitoring techniques. In some examples, a PPM is a software-application running on an electronic device (e.g., a smart phone, a tablet, etc.) that utilizes the hardware of the electronic device to monitor media consumption (e.g., using a microphone and/or camera of the electronic device). One technique for monitoring media consumption involves detecting or collecting information (e.g., ancillary codes, signatures, etc.) from audio and/or video signals that are emitted or presented by media presentation devices (e.g., televisions, stereos, speakers, computers, video display devices, video games, mobile telephones, etc.) and comparing the collected information to reference information to identify the media.

While wearing a PPM, an audience member or monitored individual performs their usual daily routine, which may include listening to the radio and/or other sources of audio media and/or watching television programs and/or other sources of visual media. As the audience member is exposed to (e.g., views, listens to, accesses, etc.) media, a PPM associated with (e.g., assigned to and carried by) that audience member detects audio and/or video information associated with the media and generates monitoring data (also referred to as metering data). In general, monitoring data may include any information that is representative of (or associated with) and/or that may be used to identify a particular media presentation (e.g., a song, a television program, a movie, a video game, etc.) and/or to identify the source of the media presentation (e.g., a television, a digital video disk player, a stereo system, etc.). For example, the monitoring data may include signatures that are collected or generated by the PPM based on the media, audio codes that are broadcast simultaneously with (e.g., embedded in) the media, infrared (IR) or radio frequency (RF) signals emitted by a remote control device and/or emitted by a transceiver configured to transmit location information, information supplied by the audience member using any of a variety of data input devices, etc.

In some examples, the PPM transmits monitoring data directly to the audience measurement entity. In some examples, the PPM transmits the monitoring data to a corresponding LPM to process and/or transmit to the audience measurement entity. For example, monitoring data (e.g., including media presentation data) collected by an LPM, PPM, or other meter is stored in a memory and transmitted via a network, such as the Internet, to a datastore managed by the audience measurement entity. Typically, such monitoring data is combined with additional monitoring data collected from a group of LPMs monitoring a group of panelist households. The monitoring data may include, but are not limited to, a number of minutes a household media presentation device (e.g., vehicle infotainment system) was tuned to a particular station, a number of minutes a media presentation device was used (e.g., consumed) by a panelist member and/or a passenger (e.g., a presentation session), demographics of the audience (which may be statistically projected based on the panelist data), information indicative of when the media presentation device is on or off, and/or information indicative of interactions with the media presentation device (e.g., station changes, volume changes, etc.), etc. As used herein, a station may be a tuned frequency, a selected stream, an address for media (e.g., a network address), and/or any other identifier for a source and/or carrier of media.

Examples disclosed herein associate (e.g., link) telemetry data from a service provider with demographics data from panelists to develop a model for predicting demographics of drivers and/or passengers of vehicles based on subsequent telemetry data. For example, when the service provider provides telemetry data corresponding to a group of vehicles to an audience measurement entity, the audience measurement entity attempts to associate one or more panelists to one or more portions of the telemetry data corresponding to the one or more panelists. In such an example, if there is PPM data that identifies media exposure to a particular radio station at a particular time and/or location for a panelist, the audience measurement entity attempts to match the PPM data with the telemetry data for a vehicle that was presenting the particular station at the particular time and/or location. In such an example, the audience measurement data can link the demographics and/or any other corresponding data of the panelist to the telemetry data for the vehicle with a time range.

After a threshold amount of linked panelist-telemetry data has been generated, the audience measurement entity can develop a model to predict demographic information based on telemetry data not associated with panelists. For example, the audience measurement entity can train a neural network based on a first portion of the linked panelist-telemetry data. After the neural network has been trained (e.g., initially or during subsequent iterations), the audience measurement entity can tune the neural network based on a second portion of linked panelist-telemetry data by inputting the telemetry data and comparing the generated demographic output to the known demographic output to determine how accurate are the output(s) demographic(s) of the neural network. If the accuracy is below a threshold, the audience measurement entity can tune the initially trained neural network with a third portion of the linked panelist-telemetry data for a subsequent iteration of training.

After the neural network is trained, the audience measurement entity can apply subsequently obtained telemetry data with unknown demographics to the trained neural network to estimate demographics for driver and/or passengers of the vehicle that gathered the corresponding telemetry data. After the demographics are obtained, examples disclosed herein can generate targeted media and/or advertisements to the vehicle (e.g., to presented via the infotainment system) and/or media output devices (e.g., smartphones, tablets, screens, speakers, etc.) in the vehicle based on the estimated demographics (e.g., gender, age, etc.) and/or the telemetry data (e.g., location, speed, etc.). For example, for telemetry data corresponding to a minivan traveling at low speeds and accessing kids music at 11:30 AM, the neural network may estimate that the vehicle includes a male between 25-40 years old with two children. Accordingly, the audience measurement entity may transmit advertisements to the vehicle corresponding to one or more open family restaurants located within a threshold distance of the vehicle. The advertisement may be presented through the speakers of the vehicle, displayed on a display in the vehicle, displayed as an icon on a navigation screen, transmitted to any connected (e.g., wired or wireless) device to be presented by the connected device, etc. Although examples disclosed herein refer to vehicles as cars and/or other automotive transportation, examples similarly implemented herein can be described in conjunction with trains, planes, boats, and/or any other type of transportation vehicle.

FIG. 1 is an illustrated example of an example in-vehicle media interaction and monitoring system 100. The in-vehicle media interaction and monitoring system 100 of FIG. 1 is adapted for determining demographics of vehicle occupants (e.g., drivers and/or passengers) and providing targeted media using in-vehicle infotainment applications. The example of FIG. 1 also shows an example audience monitor 102 (e.g., a monitor computer/server), example wireless networks 104, an example monitor database 105, an example vehicle 106, an example vehicle infotainment system 108, an example mobile device 110, an example panelist 112, an example PPM 114, example service provider servers 150, 160 and example service provider databases 154, 164. Although the vehicle 106 of FIG. 1 is a car, the vehicle 106 can be any type of transportation vehicle (e.g., train, plane, boat, etc.). Additionally, although the example of FIG. 1 is described in conjunction with vehicles, the monitor 102 of FIG. 1 could generate a model to produce output metrics linking people who consumed media with purchases, other media consumption, or website visits, utilizing Nielsen Buyer Insights (NBI)/Argus via personally identifiable information (PII) match, Nielsen Catalina Solutions (NCS) via PII match, global positioning system GPS geofences for stores, digital ad insertion and advanced video advertising, etc.

The example audience monitor 102 of FIG. 1 receives, via the wireless network 104 (e.g., network communications), metering data from the example PPM 114. The example audience monitor 102 of FIG. 1 may be an audience measurement entity and/or a central facility that may be implemented by a server that collects and processes media monitoring data from the PPM 114 and/or the mobile device 110 (e.g., when the mobile device 110 implements a meter) to generate exposure metrics related to media presented to the panelist 112. The monitor 102 analyzes the media monitoring information to identify, for example, media that the panelist 112 has been exposed to. The media monitoring information may include and/or may be correlated or processed with factors such as geodemographic data (e.g., a geographic location of the media exposure measurement location, age(s) of the panelist(s) associated with the media exposure measurement location, an income level of a panelist, etc.). The monitor 102 may process unprocessed media monitoring data from the PPM 114 of the panelist 112 in order to identify media to which the panelist 112 was exposed based on signatures of and/or codes embedded in media presented by the vehicle infotainment system 108. The monitor 102 stores the obtained media monitoring data in the example monitor database 105.

The monitor 102 of FIG. 1 also obtains telemetry data and/or reference data from one or more of the example service provider servers 150, 160. The reference data may include estimated demographics of person(s) linked to the vehicle 106 from a third party (e.g., which may be incomplete, inaccurate, and/or misleading), home and/or work address of person(s) linked to the vehicle 106, purchase history of person(s) linked to the vehicle 106, registration and/or insurance information of person(s) linked to the vehicle 106, and/or any other personal identifiable information of person(s) linked to vehicle. A person may be linked to a vehicle if they purchased the vehicle, registered the vehicle, carry insurance for the vehicle, received a ticket or citation linking them to the vehicle, and/or otherwise had identifiable information provided to one or more of the example service providers 150, 160 linking them to the vehicle. As further described below, the monitor 102 trains a neural network to estimate demographics based on telemetry and/or reference data by associating media monitoring data with known demographic information with corresponding telemetry data and/or reference data. For example, the monitor 102 may cross reference media monitoring data with the telemetry and/or reference data to find corresponding information (e.g., same media identified, a same timestamp, a same location, a same name and/or registration information, etc., between panelist data and telemetry data and/or reference data). After the monitor 102 associates panelist data with telemetry and/or reference data, the monitor 102 uses the associated panelist-telemetry-reference data to train the neural network. In this manner, when the trained neural network obtains telemetry data and/or reference data without demographic data, the neural network can estimate the demographics of the drivers and/or passengers of the vehicle that corresponds to the telemetry data and/or reference data. Additionally, the example audience monitor 102 may generate targeted media (e.g., advertisements) based on the estimated demographics, telemetry data, and/or reference data and transmit the targeted media to the infotainment system 108 of the vehicle 106 via the wireless network 104. The monitor 102 may transmit the targeted media using advanced television systems committee (ATSC) 3.0 and/or any other media delivery technique to provide targeted advertising to mobile devices and/or infotainment systems of vehicle occupants. For example, such targeted advertising can be delivered using addressability techniques (e.g., to target particular audience members, such as vehicle occupants) and digital advertisement insertion techniques (e.g., to insert or place advertisements in content or between content accessed by audience members).

The example vehicle 106 of FIG. 1 includes the vehicle infotainment system 108 (e.g., an in-vehicle media device), the mobile device 110, the panelist 112, and the PPM 114. The vehicle 106 can collect telemetry data related to operation of the car (e.g., speed, location, breaking, windows, wipers, handling, driving modes, selected options, acceleration, etc.) and/or the infotainment system 108. The example vehicle 106 of the illustrated example can be a connected car, manufactured to include the vehicle infotainment system 108, or a vehicle with aftermarket devices including the vehicle infotainment system 108. The example vehicle infotainment system 108 of the illustrated example includes an example media presenter 115, an example user interface 116, an example infotainment application 118, an example wireless transceiver 120, an example application detector 122, and an example impression detector 124.

In some examples, activation of the infotainment application 118 of FIG. 1 (e.g., in-vehicle media device application usage) will cause the media presenter 115 to access audio, visual, or both audio and visual media. The media to be presented can be either stored in the respective device or streamed via a wireless network. Additionally, the media presenter 115 may present targeted media obtained from the example audience monitor 102 (e.g., via the wireless transceiver 120).

The example panelist 112 of FIG. 1, being a passenger or driver of the vehicle 106, can control the example vehicle infotainment system 108 (e.g. in-vehicle media device) and the example mobile device 110 via their respective user interfaces 116 and 130. Collected interaction information representative of interaction by the panelist 112 with the vehicle infotainment system 108 or the mobile device 110 include, for example, an instance of usage of the example infotainment application 118 of the infotainment system 108 or the example mobile application 132 of the mobile device 110, respectively.

The impression detector 124 of FIG. 1 collects information related to the media (e.g., what media was presented, volume levels, change in volume, change in station, change in options and/or audio characteristics, whether a device is connected, station identifiers, genre identifiers, timestamps, location information, voice activated options, voice activated comments, etc.) and/or other data to include in the generated telemetry data to be sent to the example service provider server 150.

In the illustrated example, activation (e.g., instance of usage) of infotainment application 118 activates the example application detector 122. In such an example, the application detector 122 or 134 instructs the example impression detector 124 to transmit an application impression or a batch of application impressions to the example audience monitor 102 and/or the service provider server 150. In some examples, the application impression includes user and/or device identification information.

In the example of FIG. 1, the vehicle 106 interacts with the mobile device 110 via the wireless transceiver 120 of the vehicle 106 and the wireless transceiver 126 of the mobile device 110. The example mobile device 110 could be implemented using a smartphone, a tablet, a laptop or similar portable computing device. The example mobile device 110 includes the wireless transceiver 126, the media presenter 128, the user interface 130, and the mobile application 132. In some examples, the mobile device 110 may include the example PPM 114 and/or an application capable of implementing the PPM 114.

The example mobile device 110, through the wireless transceiver 126, interacts with the vehicle 106 via a wired or wireless connection. For example, the mobile device 110 may play audio accessed on the mobile device 110 through the speakers of the vehicle 106 via the infotainment application 118 of the infotainment system 108. Additionally, the wireless transceiver 126 of the mobile device 110 may receive targeted media from the wireless transceiver 120 of the infotainment system 108.

The example panelist 112, being a passenger or driver of the vehicle 106, can control the example vehicle infotainment system 108 (e.g. in-vehicle media device) and the example mobile device 110 via their respective user interfaces 116 and 130. As the panelist 112 interacts with the vehicle infotainment system 108 or the mobile device 110 collected panelist information includes, for example, an instance of usage of the example infotainment application 118 of the vehicle infotainment system 108 or the example mobile application 132 of the mobile device 110, respectively.

In some examples, activation of the infotainment application 118 (e.g., in-vehicle media device application usage) or the mobile application 132 will cause the respective media presenter 115 or 128 to access audio, visual, or both audio and visual media. The media to be presented can be either stored in the respective device or streamed via a wireless network.

Additionally, the example mobile device 110 in wireless communication with the vehicle 106 can present via the example media presenter 115, audio, visual, or both audio and visual media from the example mobile application 132. The presentation of media at the media presenter 128 of the mobile device 110 may activate the example impression detector 124 which transmits a notification of a mobile application impression (e.g., an indication that media was accessed via the mobile device 110) to the monitor 102 and/or the service provider server 150.

The example PPM 114 of FIG. 1 is a device that may be carried or worn by the example panelist 112 as shown in FIG. 1. In particular, the example PPM 114 may be configured to monitor media to which the panelist 112 is exposed using one or more media detection devices. For example, the PPM 114 may include one or more media detection devices (e.g., sensor(s), microphone(s), camera(s), etc.) used to detect presented media and generate or collect media monitoring information or media-related data based on, for example, audio signals, visual signals, radio frequency signals, etc. In some examples, the PPM 114 may collect media monitoring information (e.g., ancillary codes, signatures, etc.) associated with any media (e.g., video, audio, movies, music, still pictures, advertising, computer information, etc.) to which the panelist 112 is exposed. For example, the PPM 114 may be configured to obtain audio codes (e.g., watermarks), generate or collect signatures, fingerprints, etc. that may be used to identify video programs (e.g., DVD movies, streaming video, video programming, etc.), audio programs (e.g., CD audio, streaming audio, radio programming, etc.), advertisements, etc. by sensing ambient audio. In other examples, the PPM 114 may include a camera or other sensor to obtain video codes (e.g., watermarks), generate or collect video signatures, fingerprints, etc. that may be used to identify billboards, signs, video programs, audio programs, advertisements, etc. by sensing ambient video and/or images using the camera or sensor. In some examples, the PPM 114 and/or the mobile device 110 may identify the media based on the codes embedded in the media and/or the signatures generated based on the media. For example, the PPM 114 and/or mobile device 110 may compare the obtained codes and/or generated signatures to a database of reference codes and/or reference signatures stored in a reference database to identify a match corresponding to particular media. In such examples, the identified media is included in media monitoring data that may be transmitted to the example audience monitor 102 for further analysis/processing (e.g., to credit exposure to the media). In some examples, the PPM 114 forwards the obtained codes and/or generated signatures to the infotainment system 108 and/or the mobile device 110 to transmit to the monitor 102 (e.g., as unprocessed media monitoring data). In such examples, the monitor 102 pre-processes the unprocessed media monitoring data to identify the media corresponding to the obtained codes and/or generated signatures at the monitor 102 prior to crediting the media. The PPM 114 may be linked with a LPM to provide household identification and/or head of household information. Additionally or alternatively, the monitor 102 may utilize common homes identifications with one or more Nielsen panels such as PPM panels, television panels, Nielsen Scarborough, survey panels, audio diary panels, or other Nielsen assets to include with the panelist data to train a neural network to estimate demographics. Common homes is a system that compares metering data from panelists with set-top-box data, and/or device that can media monitor, corresponding to the same panelists.

Impressions corresponding to the vehicle infotainment system 108, the mobile device 110, and/or the PPM 114 could be collected using any suitable media impression techniques including those techniques disclosed in Blumenau, U.S. Pat. No. 6,108,637, which is hereby incorporated herein by reference in its entirety, in international patent application no. PCT/US11/52623, filed on Sep. 21, 2011,which is hereby incorporated herein by reference in its entirety, Burbank et al., U.S. Pat. No. 8,930,701, which is hereby incorporated herein by reference in its entirety, and/or Mazumdar et al., U.S. Pat. No. 8,370,489, which is hereby incorporated herein by reference in its entirety.

The example service provider server 150 of FIG. 1 is a server owned or operated by the creator and/or manager of the vehicle 106 and/or the infotainment system 108. The service provider server 150 collects telemetry data related to fleets of cars managed by the service provider server 150 via the network 104. In some examples, the service provider server 150 forwards the telemetry data to the example audience monitor 102. In such examples, the service provider server 150 may remove any identifying information from the telemetry data (e.g., driver identification information) prior to forwarding to the monitor 102. As described above, because the service provider server 150 may have limited, incomplete, or no demographic information of the owner of the vehicle 106 and likely no demographic information of drivers and/or passengers of the vehicle that are not the owner, the telemetry data may be used to train a neural network to estimate demographics of drivers and/or passengers within the vehicle and to create targeted media (e.g., custom media) for the vehicle based on telemetry data. In some examples, the monitor 102 analyzes purchase histories of vehicle occupants to identify purchased products and/or services and uses the identified purchases to select relevant advertising. The monitor 102 may deliver the targeted media (e.g., using Advanced Television Systems Committee (ATSC 3.0) next-generation broadcast standard and/or any other media delivery technique) to the service provider server 150 via the network 104 and the service provider server 150 can send the targeted media to the infotainment system 108 of the vehicle 106 to present the targeted media and/or transmit the targeted media to connected devices (e.g., the mobile device 110). Additionally or alternatively, the monitor 102 may deliver the targeted media to the vehicle 106 and/or the mobile device 110 directly (e.g., in accordance with media communication procedures defined in the ATSC 3.0 next-generation broadcast standard and/or any other media delivery technique). Additionally or alternatively, the monitor 102 may transmit the demographics and/or targeted media to a third-party media generator so that the third-party media generator can update, tune, or create new targeted media to be sent to the vehicle 106. In some examples, the monitor 102 or a third-party vendor may transmit the targeted media to upcoming (e.g., based on location data and directional data of the vehicle) smart billboards to display the advertisement to the driver on the billboard. The service provider server 150 stores the telemetry data in the example service provider database 154. The service provider server 150 may be multiple service providers and/or may be combined with the service provider server 160 and/or the example audience monitor 102. Examples disclosed herein may employ one or more media-delivery procedures defined in the ATSC 3.0 standard for digital television to deliver targeted media. For example, examples disclosed herein may employ ATSC A/311, signaling, delivery, synchronization, and/or error protection protocols of the ATSC 3.0 standard.

The example service provider server 160 of FIG. 1 stores (in the example service provider database 164) and/or manages other reference data. For example, the service provider server 160 may store and/or manage vehicle registration data, license plate data, demographic data, purchase history data, zip code data corresponding the residence and/or workplace of the owner of the vehicle 106, radio station broadcasting data, radio station encoding data, etc. The example service provider server 160 may be implemented by an entertainment provider entity, a state entity, a government entity, a credit reporting entity (e.g., EXPERIAN®), a social media entity (e.g., FACEBOOK®, TWITTER®, INSTAGRAM®, etc.), a credit entity, and/or any other entity that collects and/or monitors demographic data, registration data, and/or any other data related to the vehicle 106 and/or occupants of the vehicle 106. In some examples, the service provider server 160 and/or another processor may estimate demographics of a person linked to a vehicle based on the reference data and add the estimated demographics to the reference data. For example, the service provider server 160 may cross reference an address from a registration, insurance, or any other sign up information to demographics of the area where the address is located. However, such demographic information may be inaccurate and/or dated. The example service provider server 160 provides the reference data to the example audience monitor 102 for building the neural network and/or using the neural network to estimate demographics. The service provider server 160 may be multiple service providers and/or may be combined with the service provider server 150 and/or the example audience monitor 102.

Figure 2:
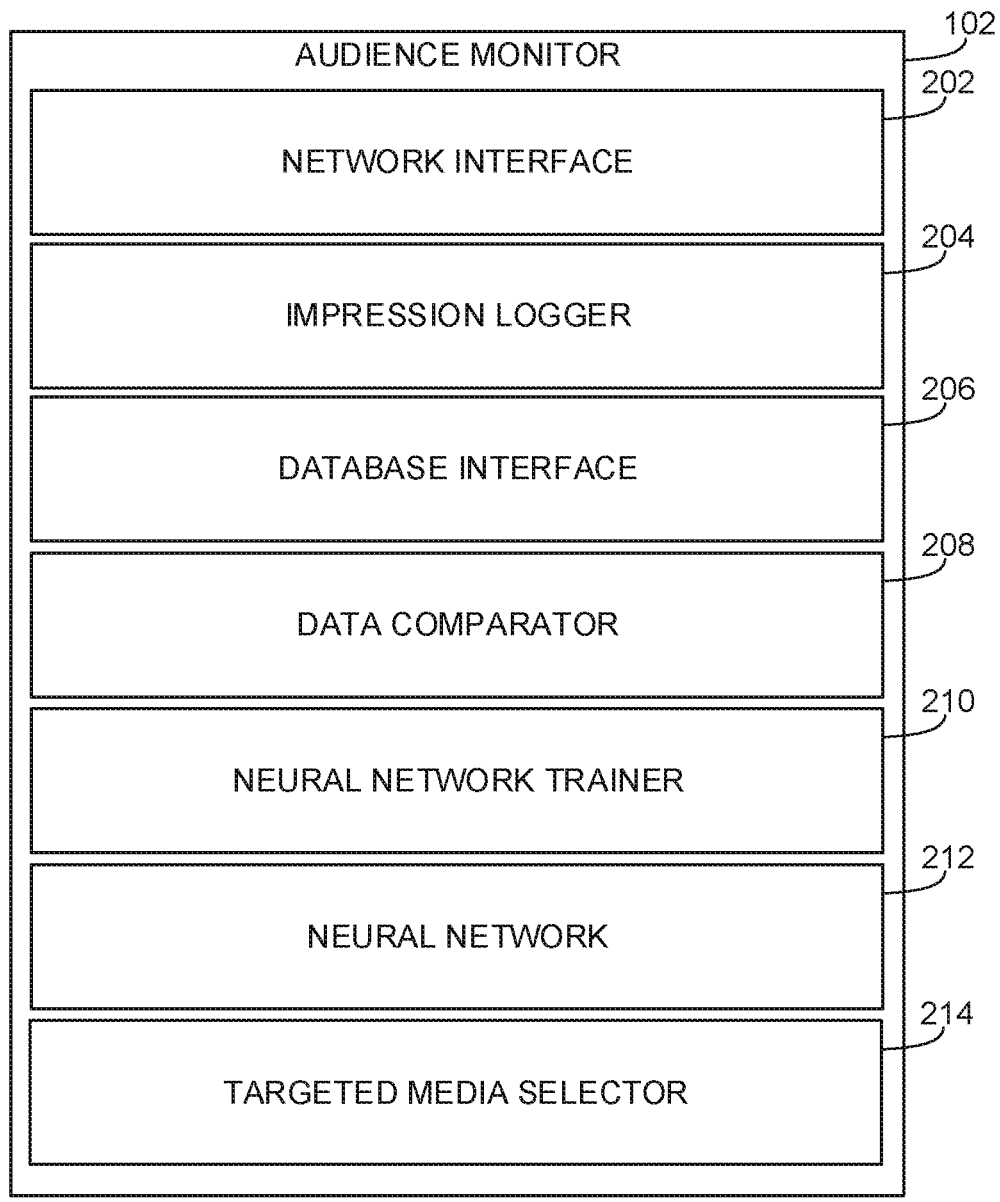
FIG. 2 is a block diagram of an example audience monitor of FIG. 1.

FIG. 2 is a block diagram of the example audience monitor 102 to train a neural network to estimate demographics of occupants of vehicles based on telemetry data and/or reference data. The example audience monitor 102 includes an example network interface 202, an example impression logger 204, an example database interface 206, an example data comparator 208, an example neural network trainer 210, an example neural network 212, and an example targeted media selector 214.

In the illustrated example, the example audience monitor 102 (e.g., a computer/server at an audience measurement entity) receives data via the network interface 202 of FIG. 2. The example network interface 202 interacts with the PPM 114 to obtain metering data. The example network interface 202 also receives telemetry data from the service provider server 150 and/or reference data from the service provider server 160. Additionally, the network interface 202 may transmit targeted media (e.g., using ATSC 3.0 and/or any other media delivery technique) to the infotainment system 108 (e.g., directly or via the service provider server 150) and/or the mobile device 110 (e.g., directly or indirectly). In the illustrated example, the network interface 202 receives information via the wireless network 104, however in other examples, the information could be sent via wired communication or various other similar data communication methods.

The example network interface 202 of FIG. 2 interacts with the impression logger 204. The example impression logger 204 logs media impressions sent by the PPM 114 of FIG. 1. The impression logger 204 logs the media impression in conjunction with the information provided by the panelist (e.g., demographics) and/or any other corresponding data (e.g., location data, timestamps, etc.) and stores the information as panelist data in the example monitor database 105 via the database interface 206.

The example data comparator 208 of FIG. 2 compares the panelist data to telemetry data and/or reference data to identify whether any of the telemetry data corresponds to a monitored panelist. For example, the data comparator 208 may obtain registration data from panelist data in the monitor database 105 and identify a match with registration data from the service provider database 154 and/or the service provider database 164 to identify matching information that can link the panelist data with the telemetry data and/or other reference data. Additionally or alternatively, the example data comparator 208 may compare media exposure data of the panelists with media exposure data in the telemetry data to identify a match. For example, the data comparator 208 may identify that a panelist was exposed to a particular song at a particular location and time. If the example data comparator 208 identifies, based on the telemetry data, that the particular song was presented by a vehicle at the same time and location, the data comparator 208 may be able to determine that the panelist was in the vehicle. Once the data comparator 208 links the panelist to telemetry data or a particular vehicle and/or other reference data, the database interface 206 stores the panelist-telemetry-reference link in the monitor database 105. The linked panelist-telemetry-reference data is panelist data that has been linked to corresponding telemetry data and/or reference data.

The example neural network trainer 210 of FIG. 2 uses the linked panelist-telemetry-reference data to train the example neural network 212. For example, the neural network trainer 210 can train the neural network 212 to estimate demographics of occupants of the vehicle 106 based on which station the radio of the vehicle 106 is tuned to, the location of the vehicle 106, estimated demographics of a person(s) linked to the vehicle from a third party, location of the residence of the person(s) linked to the vehicle, personal identification information corresponding to the vehicle, and make and/or model of the vehicle 106. The example neural network trainer 210 may train the neural network 212 after a threshold number of linked data has been received. Additionally or alternatively, the neural network trainer 210 can continue training (e.g., tune or adjust) an already implemented neural network 212 periodically, aperiodically, and/or based on a trigger. The example neural network trainer 210 trains the neural network 212 using one or more subgroups of the linked data and tests the accuracy of the neural network 212 using one or more subgroups of the linked data that have not been used to train the neural network 212. The example neural network trainer 210 uses an iterative process to tune the neural network 212 based on the one or more subgroups of the linked data until the accuracy satisfies a threshold.

An artificial neural network such as the neural network 212 of FIG. 2 is a computer system architecture model that learns to do tasks and/or provide responses based on evaluation or "learning" from examples having known inputs and known outputs. A neural network such as the neural network 212 features a series of interconnected nodes referred to as "neurons" or nodes. Input nodes are activated from an outside source/stimulus, such as input training data from the neural network trainer 210. The input nodes activate other internal network nodes according to connections between nodes (e.g., governed by machine parameters, prior relationships, etc.). The connections are dynamic and can change based on feedback, training, etc. By changing the connections, an output of the neural network 212 can be improved or optimized to produce more/most accurate results. For example, the neural network 212 can be trained using information from one or more sources to map inputs to a demographics determination, etc.

Machine learning techniques, whether neural networks, deep learning networks, support vector machines, and/or other experiential/observational learning system(s), can be used to generate optimal results, locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

For example, deep learning utilizes convolutional neural network (CNN) segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low-level features. While examining an image, for example, rather than looking for an object, it is more efficient to look for edges that form motifs which form parts, which form the object being sought. These hierarchies of features can be found in many different forms of data.

Learned observable features include objects and quantifiable regularities learned by the machine during supervised learning. A machine provided with a large set of well-classified data is better equipped to distinguish and extract the features pertinent to successful classification of new data.

A deep learning machine that utilizes transfer learning can properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information. As a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine has been trained to operate according to a specified threshold, etc.), the machine can be deployed for use (e.g., testing the machine with "real" data, etc.). During operation, neural network classifications can be confirmed or denied (e.g., by an expert user, expert system, reference database, etc.) to continue to improve neural network behavior. The example neural network 212 is then in a state of transfer learning, as parameters for classification that determine neural network behavior are updated based on ongoing interactions. In certain examples, the neural network such as the neural network 212 can provide demographic estimates based on telemetry data and/or reference data. In certain examples, the neural network 212 generates data that is buffered (e.g., via the cloud, etc.) and validated before it is provided to another process.

In the example of FIG. 2, the neural network 212 receives a subset of panelist data linked to telemetry data and/or reference data corresponding to a vehicle in which a panelist was located. The neural network 212 adjusts the weights of the neurons so that when the telemetry data and/or reference data is used as an input, the neural network 212 will generate the demographic information that corresponds to the panelist data. In this manner, once trained, the example neural network 212 can input telemetry and/or reference data and generate demographic estimates. For example, if the neural network 212 is trained using station(s) of the radio presented by vehicles of or including panelists, vehicle location of panelists, estimated demographics of a panelist(s) linked to vehicles, location of the residence of the panelist(s) linked to vehicles, personal identification information corresponding to vehicles of or including panelists, and make and/or model of vehicles of or including panelists, the neural network 212 can generate an estimated demographics for occupant(s) of a vehicle based on any combination of the current audio output by the vehicle, the location of the vehicle, estimated demographics of a person(s) linked to the vehicle from a third party, location of the residence of the person(s) linked to the vehicle, personal identification information corresponding to the vehicle, and/or make and/or model of the vehicle.

The initially trained neural network 212 of FIG. 2 can be tuned any amount of times with additional iterations using additional subsets of the linked data. In some examples, the network interface 202 may transmit the estimated demographics to the service provider server 150, a third-party media generator and/or a third-party advertiser. In such examples, the service provider server 150, the third-party media generator and/or the third-party advertiser may create targeted media and/or advertisements to send to mobile devices in the corresponding vehicle (e.g., directly and/or via the infotainment system of the vehicle). The neural network 212 may be based on household member demographic identification and/or vehicle occupant demographic identification, as further described below in conjunction with FIGS. 3 and 4.

The example targeted media selector 214 of FIG. 2 selects and/or generates targeted media (e.g., in real-time) based on the estimated demographics, telemetry data, and/or reference data of drivers and/or passengers of a vehicle. For example, if the neural network 212 generates estimated demographics for a driver of a vehicle that is male aged 25-35, the telemetry data identifies that the driver accelerates quickly (e.g., by more than a threshold), and the reference data identifies that the vehicle was purchased by the driver over 7 years ago, the targeted media selector 214 may select and/or generate an advertisement for new sports cars. The targeted media selector 214 may select the advertisement from a database of advertisements that correspond to different demographics, telemetry data, and/or reference data. Additionally, the targeted media selector 214 may use location data of the telemetry data to find local dealerships and present an advertisement for the local dealership and/or place an indicator for and/or provide directions to the local dealership on a navigation screen. The network interface 202 may transmit (e.g., using ATSC 3.0 and/or any other media delivery technique) the targeted media (e.g., directly or indirectly via the service provider server 150 or a third-party) to the infotainment system 108 of FIG. 1, the mobile device 110 (e.g., directly or via the infotainment system 108), and/or to other devices registered or otherwise linked to the driver (e.g., personal computer, smart television, etc.). In this manner, the targeted media may be presented to the vehicle occupants as part of digital advertisement insertion (DAI), thereby providing real-time media with addressability to particular occupants.

FIGS. 3A-3C illustrate example telemetry inputs 300 corresponding to household demographics (e.g., potential occupants of a vehicle) for the neural network 212 of FIG. 2, example panelist-telemetry links 305, and example outputs 310 of the neural network 212 of FIG. 2. Although the example of FIGS. 3A-3C illustrates particular data, the inputs, links, and/or outputs may include additional and/or different data. The example of FIGS. 3A-3C relates to a household member demographic information model where the output of the model will include probabilities of a given set of demographic profiles belonging to the household to which the vehicle belongs.

The telemetry example inputs 300 of FIG. 3A include telemetry data from four different vehicles. The first vehicle (vehicle ID 111 in Table 310 of FIG. 3C) has logged a trip start time and date at a particular location (e.g., at the city level) including a particular phone identifier (ID). The trip start time and/or location may be set to a different granularity (e.g., more or less granular time, more or less granular location, etc.). The phone ID may be included if a phone has been connected to the infotainment system 108 and/or if the infotainment system 108 otherwise recognized the presence of the phone even though not connected. Additionally, the monitor 102 may utilize common homes identification with Nielsen panels such as PPM panels, television panels, Nielsen Scarborough survey data from panels, audio diary panels, or other Nielsen assets to include with the panelist data to train the neural network 212.

The example panelist telemetry links 305 of FIG. 3B illustrates how the telemetry data is linked to panelist data. For example, the monitor 102 links vehicle 111 from the input telemetry data 300 to the PPM household ID AAA which includes an 18 year old female panelist and a 22 year old male panelist. In some examples, the monitor 102 may have linked the household identifier to the vehicle based on, for example, the phone ID because the panelist household ID may be linked with phone ID a4bd85. In some examples, the monitor 102 may link the household identifier to the vehicle based on the timestamp and/or location data that match(es) the timestamp and/or location data of one or more of the panelists that correspond to the household identifier. In some examples, the monitor 102 may link the household identifier to the vehicle using vehicle registration data and/or demographic data. Additionally or alternatively, the monitor 102 may leverage PPM in-vehicle detection software that uses motion data captured by the PPM 114 to indicate if the PPM 114 and panelist 112 were likely traveling by vehicle. In some examples, the PPM device 114 may also identify occupants of the vehicle during a trip as each panelist possesses their own PPM that can be used to learn occupancy.

As described above, the neural network 212 may be trained using the panelist telemetry links 305. The model (e.g., the neural network 212) overcomes significant challenges with ownership and registration data that does not reflect population of potential vehicle occupants. Ownership and registration data skews significantly toward older persons and men than the population in general. Correct identification of the entire household and not just the owner and/or registration holder increases the accuracy of audience estimation within a vehicle. As described above, common homes can be used to create training data for the neural network 212. The people in such common homes have PPMs and overlapping vehicle data.

The example output data 310 of FIG. 3C represent probability values of demographics that correspond to estimated demographics of drivers and/or passengers of vehicles based on the input telemetry and/or reference data. The probability values of demographics correspond to the likelihood that an occupant belongs to one or more demographics. For example, if telemetry data and/or reference data from the vehicle ID 111 are input into the trained neural network 212, the neural network 212 will output the probability values of different demographics of people being located within the vehicle. In the illustrated output data 310, if the telemetry and/or referenced data from vehicle ID 111 is input into the trained neural network 212, the neural network 212 will determine that there is an 89% probability of likelihood that the vehicle includes a female between 18-49 years old and a male between 18-49 years old. In some examples, the monitor 102 may calibrate the probabilities to population estimates to ensure that individual assignments are collectively representative of the population.

FIGS. 4A-C illustrate example telemetry inputs 400 corresponding to occupants for a given trip and/or at a particular time for the neural network 212 of FIG. 2, example panelist-telemetry links 405 and example outputs 410 of the neural network 212 of FIG. 2. Although the example of FIGS. 4A-C illustrates particular data, the inputs, links, and/or outputs may include additional and/or different data. The example of FIGS. 4A-C relates to a vehicle occupant demographic identification model where the results of the model depend on the household member identification process described in FIGS. 3A-C.

The example telemetry inputs 400 of FIG. 4A include telemetry data from four different vehicles. The first vehicle (vehicle ID 111 of the table 410 of FIG. 4C) has logged a trip start time and date at a particular location (e.g., at the city level) including a particular phone identifier (ID). The trip start time and/or location may be set to a different granularity (e.g., more or less granular time, more or less granular location, etc.). The phone ID may be included if a phone has connected to the infotainment system 108 and/or if the infotainment system 108 otherwise recognized the presence of the phone even though not connected. Additionally, the monitor 102 may utilize common homes identifications with Nielsen panels such as PPM panels, television panels, Nielsen Scarborough survey data from panels, audio diary panels, or other Nielsen assets to include with the panelist data to train the neural network 212.

The example panelist telemetry links 405 of FIG. 4B illustrate how the telemetry data is linked to panelist data. For example, the monitor 102 links the vehicle ID 111 from the input telemetry data 400 to the PPM household ID AAA which includes a 18 year old female panelist starting a trip at 12 pm on Jan. 1, 2020. In some examples, the monitor 102 may have linked the household identifier to the vehicle based on, for example, the phone ID because the panelist household ID may be linked with phone ID a4bd85. In some examples, the monitor 102 may link the household identifier to the vehicle based on the timestamp and/or location data that match the timestamp and location data of one or more of the panelists that correspond to the household identifier. In some examples, the monitor 102 may link the household identifier to the vehicle using vehicle registration data and/or demographic data. Additionally or alternatively, the monitor 102 may leverage PPM in-vehicle detection software that uses motion data capture by the PPM 114 to indicate if the PPM 114 and panelist 112 were likely traveling by vehicle. In some examples, the PPM device 114 may also identify occupants of the vehicle during a trip as each panelist possesses their own PPM that can be used to learn occupancy.

As described above, the neural network 212 may be trained using the panelist telemetry links 405. The model (e.g., the neural network 212) overcomes significant challenges with ownership and registration data that does not reflect population of potential vehicle occupants. Ownership and registration data skews significantly toward older persons and men than the population in general. Correct identification of the entire household and not just the owner and/or registration holder increases the accuracy of audience estimation within a vehicle. As described above, common homes can be used to create training data for the neural network 212. The people in such common homes have PPMs and overlapping vehicle data. When deployed against the entire vehicle fleet being modeled, the trained model outperforms ownership, registration, and telemetry-based approaches to inferring the occupants for a trip and therefore the audience for any media exposure with the trip. Either model of FIGS. 3A-3C or FIG. 4A-4C may include additional data cleaning methods. Cleaning methods are any method to remove and/or adjust data that leads to inaccurate results. For example, cleaning methods may include outlier mitigation techniques, removal of machine events that are not true media exposures, modeling of whether the volume of media is likely to be audible, etc.

The example output data 410 of FIG. 4C corresponds to estimated demographics of drivers and/or passengers of vehicles at the identified time/date based on the input telemetry and/or reference data. For example, if telemetry data and/or reference data from vehicle ID 111 are input into the trained neural network 212, the neural network 212 will generate the probabilities of different demographics of people being located within the vehicle. In the illustrated output data 410, if the telemetry and/or reference data from vehicle ID 111 is input into the trained neural network 212, the neural network 212 determines a first probability value indicative of an 89% chance or likelihood that the vehicle includes a female between 18-49 years old and a second probability value indicative of a 90% change or likelihood that the vehicle includes a male between 18-49 years old. In some examples, the monitor 102 may calibrate the probabilities to population estimates to ensure that individual assignments are collectively representative of the population.

While an example manner of implementing the example audience monitor 102 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example impression logger 204, the example database interface 206, the example data comparator 208, the example neural network trainer 210, the example neural network 212, the example targeted media selector 214, and/or, more generally, the example audience monitor 102 of FIG. 2 may be implemented by hardware, software, firmware and/or any combination of hardware, software and/or firmware. Thus, for example, any of the example network interface 202, the example impression logger 204, the example database interface 206, the example data comparator 208, the example neural network trainer 210, the example neural network 212, the example targeted media selector 214, and/or, more generally, the example audience monitor 102 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example impression logger 204, the example database interface 206, the example data comparator 208, the example neural network trainer 210, the example neural network 212, the example targeted media selector 214, and/or, more generally, the example audience monitor 102 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience monitor 102 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
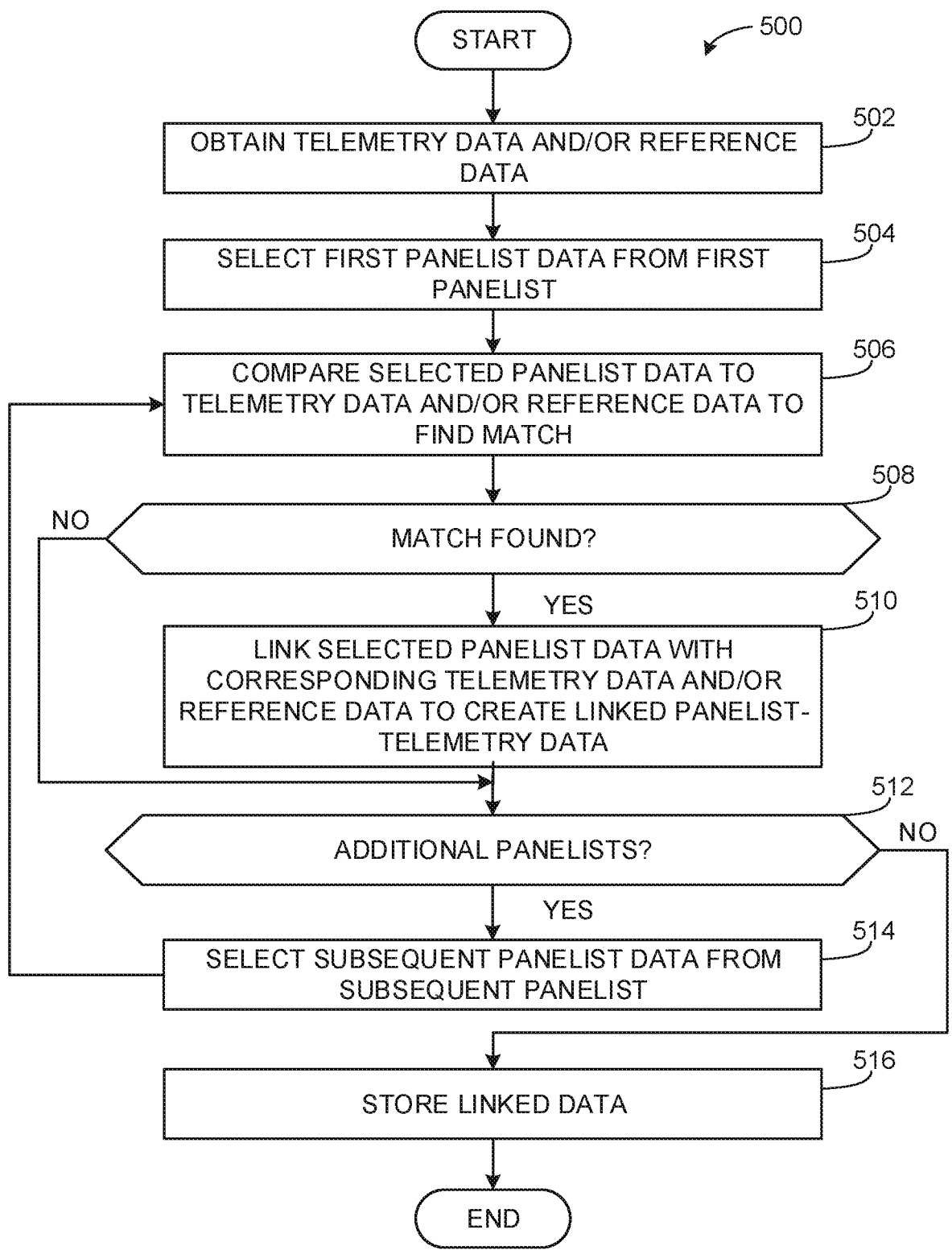
FIG. 5 is a flowchart representative of example machine readable instructions that may be executed to implement the audience monitor of FIGS. 1 and/or 2 to link panelist data to telemetry data.
Figure 6:
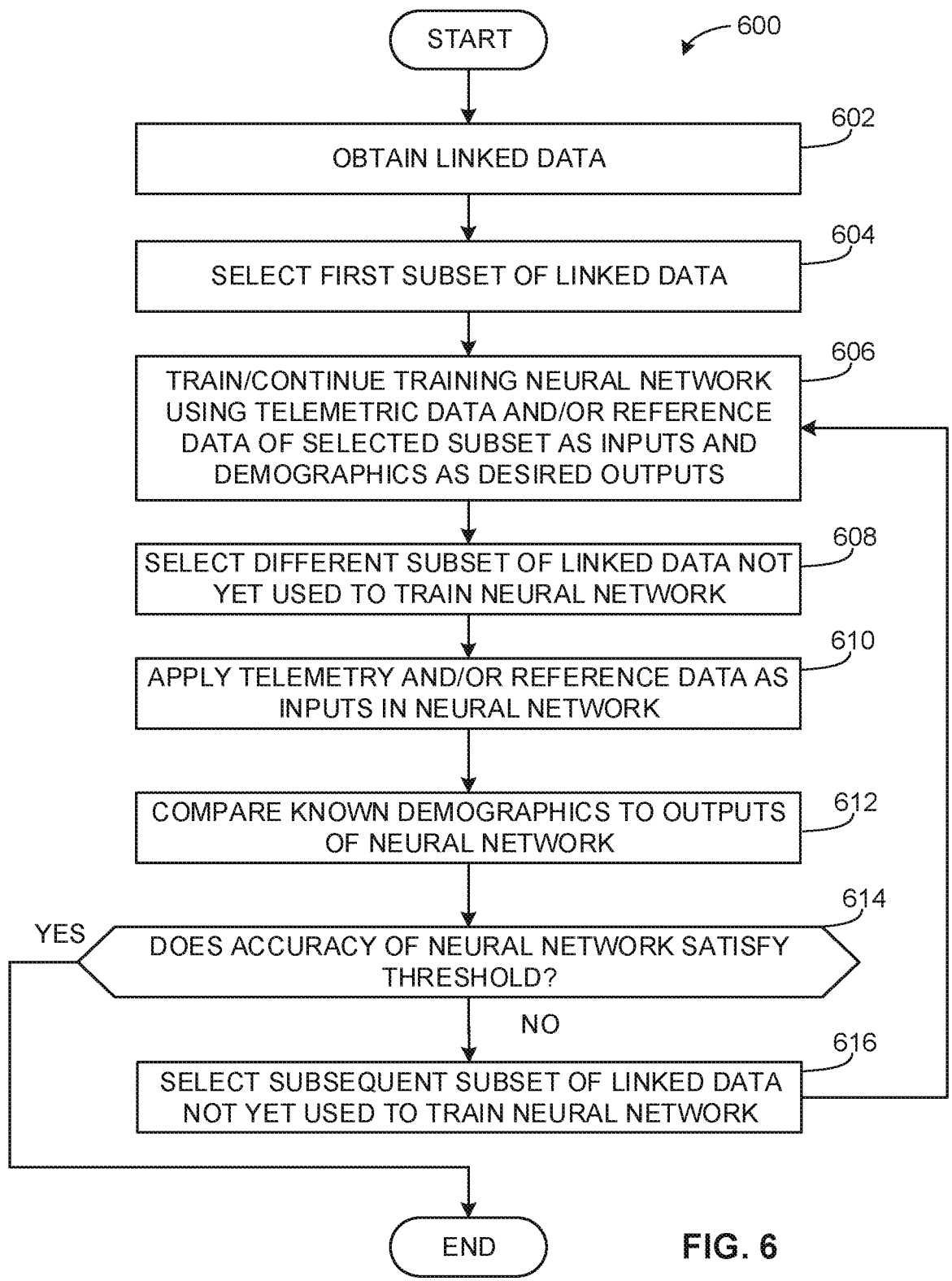
FIG. 6 is a flowchart representative of example machine readable instructions that may be executed to implement the audience monitor of FIGS. 1 and/or 2 to train a model based on linked panelist-telemetry data.
Figure 7:
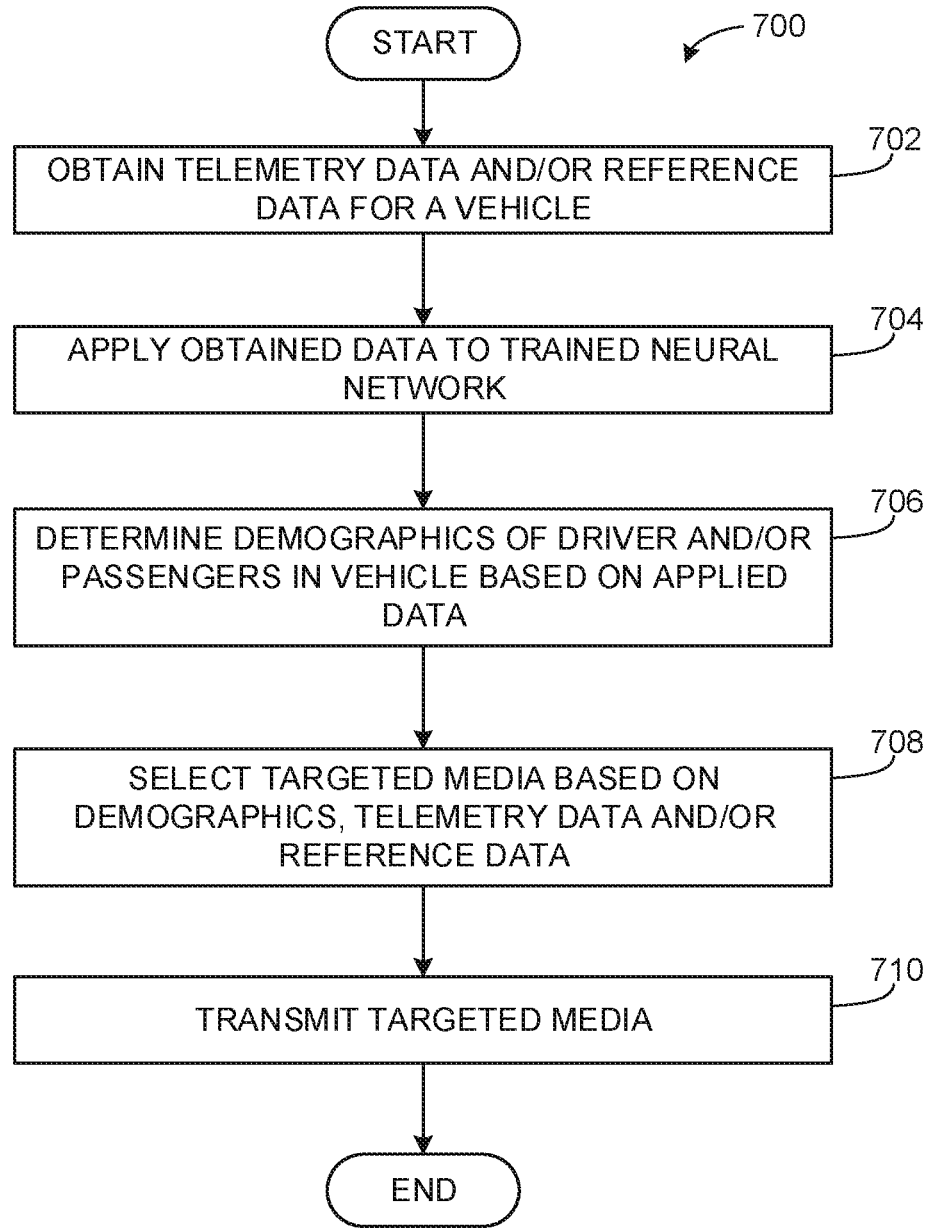
FIG. 7 is a flowchart representative of example machine readable instructions that may be executed to implement the audience monitor of FIGS. 1 and/or 2 to estimate demographics and/or deliver targeted media to occupants of a vehicle based on telemetry data of the vehicle.

Flowcharts representative of example hardware logic, machine readable instructions, hardware implemented state machines, and/or any combination thereof for implementing the example audience monitor 102 of FIG. 1 and/or 2 are shown in FIGS. 5-7. The machine readable instructions may be one or more executable programs or portion(s) of an executable program for execution by a computer processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entireties of the program(s) and/or parts thereof could alternatively be executed by a device other than the processor 812 and/or embodied in firmware or dedicated hardware. Further, although the example program(s) is/are described with reference to the flowcharts illustrated in FIGS. 5-7, many other methods of implementing the example audience monitor 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is an example flowchart representative of example machine readable instructions 500 that may be executed to implement the example audience monitor 102 of FIGS. 1 and/or 2 to link panelist data with corresponding telemetry data. At block 502, the example network interface 202 (FIG. 2) obtains telemetry data from the example service provider server 150 of FIG. 1 and/or reference data from the example service provider server 160 of FIG. 1. At block 504, the example data comparator 208 (FIG. 2) selects first panelist data from a first panelist from the example monitor database 105 (FIG. 1) via the example database interface 206 (FIG. 2). The first panelist data includes media exposure data based on the metering data generated by the PPM used by the first panelist.

At block 506, the example data comparator 208 compares the selected panelist data to the telemetry data and/or the reference data to find a match (e.g., the telemetry data that corresponds to the first panelist). For example, the data comparator 208 may attempt to find media exposure data (e.g., a station, at a location, at a time) from the panelist data that matches media exposure data from the telemetry data (e.g., the same station, location, and time). Additionally or alternatively, the data example comparator 208 may use information from the telemetry data (e.g., vehicle ID) to find additional information from the reference data (e.g., registration data with a name or location or registration) that corresponds to the panelist.

At block 508, the example data comparator 208 determines if a match was found between the panelist data and the telemetry data. If the example data comparator 208 determines that a match was not found (block 508: NO), control continues to block 512. If the example data comparator 208 determines that a match was found (block 508: YES), the data comparator 208 links the selected panelist data with corresponding telemetry data and/or reference data to create (e.g., generate) linked panelist-telemetry data, linked panelist-reference data, and/or linked panelist-telemetry-reference data (block 510). For example, the data comparator 208 may link the demographics of the panelist with the corresponding telemetry data and/or reference data. In this manner, the linked data may be used as known data (e.g., truth data) to train the example neural network 212. In some examples, the data comparator 208 may link the selected panelist data with corresponding telemetry data by finding first media exposure data from the panelist data that matches second media exposure data from the first telemetry data. In some examples, the data comparator 208 may link the selected panelist data to corresponding reference data by finding reference data that corresponds to a panelist (e.g., based on a name, an identifier, identifying information, an address, etc.).

At block 512, the example data comparator 208 determines if there are additional panelists to attempt to link from the monitor database 105. If the example data comparator 208 determines there is an additional panelist to process (block 512: YES), the example data comparator 208 selects subsequent panelist data from a subsequent panelist (block 514) and control returns to block 506 to process the subsequent panelist data. If the example data comparator 208 determines there are no additional panelists to process (block 512: NO), the example database interface 206 (FIG. 2) stores the linked data in the monitor database 105 (block 516).

FIG. 6 is an example flowchart representative of example machine readable instructions 600 that may be executed to implement the example audience monitor 102 of FIGS. 1 and/or 2 to train the example neural network 212 (FIG. 2) to estimate demographics based on telemetry data and/or reference data. At block 602, the example database interface 206 (FIG. 2) obtains the linked panelist-telemetry data (e.g., generated in conjunction with FIG. 5) from the example monitor database 105. At block 604, the example neural network trainer 210 (FIG. 2) selects a first subset of linked data. The size of the subset (e.g., the number of linked data entries) may be based on user and/or manufacturer preferences.

At block 606, the example neural network trainer 210 trains the neural network 212 (FIG. 2) using the telemetric data and/or reference data of the selected subset as inputs and the demographics as desired outputs (e.g., probability values of demographics). As described above in conjunction with FIG. 2, the neural network 212 adjusts the weights of neurons so that when the telemetric data and/or reference data is entered as an input, the demographic percentages that are generated correspond to the demographics of the corresponding demographics of the panelist data.

At block 608, the example neural network trainer 210 selects a different subset of linked data not yet used to train the neural network 212. The different subset of linked data is used to test the accuracy of the neural network 212 by entering the telemetry and/or reference data from the different subset of linked data and comparing the estimated outputs (e.g., probability values of demographics) to the known demographics. At block 610, the example neural network trainer 210 applies the telemetry data and/or reference data as inputs in the neural network 212. At block 612, the example neural network trainer 210 compares (e.g., using any statistical comparison) the known demographics from the subset of the linked data to the outputs (e.g., probability values of demographics) of the neural network to determine the accuracy of the neural network 212.

At block 614, the example neural network trainer 210 determines if the accuracy of the neural network satisfies a threshold (e.g., based on user and/or manufacturer preferences). If the example neural network trainer 210 determines that the accuracy of the neural network satisfies the threshold (block 614: YES), the process ends. If the example neural network trainer 210 determines that the accuracy of the neural network 212 does not satisfy the threshold (block 614: NO), the example neural network 212 selects a subsequent subset of the linked data not yet used to train the neural network 212 (block 616), and control returns to block 606 to continue to train the neural network 212 using the subsequent linked data.

FIG. 7 is an example flowchart representative of example machine readable instructions 700 that may be executed to implement the example audience monitor 102 of FIGS. 1 and/or 2 to generate targeted media based on estimated demographics from telemetry data and/or reference data. Although the instructions 700 of FIG. 7 are described in conjunction with the example audience monitor 102, part or all of the instructions 700 may be executed by a processor of the service provider server 150, 160, or a third-party media/advertisement generator after receiving the demographic data, the telemetry data, and/or the reference data.

At block 702, the example network interface 202 (FIG. 2) obtains the telemetry data and/or reference data for a vehicle. At block 704, the trained neural network 212 inputs the obtained telemetry data and/or reference data. At block 706, the example neural network 212 determines (e.g., estimates) demographics of the driver and/or passengers in the vehicle based on the applied data. An example of an output from the neural network 212 is described above in conjunction with FIGS. 3A-3C and/or 4A-4C. In some examples, the network interface 202 (FIG. 2) transmits the estimated demographics, telemetry data, and/or reference data to the service provider server 150, 160 and/or a third-party media generator. In this manner, the service provider server 150, 160 and/or a third-party media generator can generate targeted media based on the transmitted information.

At block 708, the example targeted media selector 214 (FIG. 2) selects targeted media based on the demographics, the telemetry data, and/or the reference data. For example, if the telemetry data identifies that the vehicle needs to be serviced (e.g., based on engine problems, tire problems, etc.), and the estimated demographics indicate that the driver corresponds to an economic level below a threshold, the targeted media selector 214 may generate an advertisement for a discount auto-repair shop within a threshold distance to the driver. At block 710, the example network interface 202 transmits the targeted media. The example network interface 202 may transmit (e.g., using ATSC 3.0 and/or any other media delivery technique) the targeted media directly to one or more mobile devices of the one or more occupants in the corresponding vehicle, directly to the infotainment system in the corresponding vehicle, indirectly to the infotainment system via the service provider server 150, indirectly to the mobile devices via (1) the infotainment system, (2) the service provider server 150 and the infotainment system, (3) via a third-party provider (e.g., the provider of the mobile device), etc. In some examples, the network interface 202 may transmit (e.g., directly or indirectly) the targeted media to a smart billboard in viewing proximity to the vehicle and/or to another device that belongs to the occupant(s) of the vehicle (e.g., a home computer, a smart television, etc.).

Figure 8:
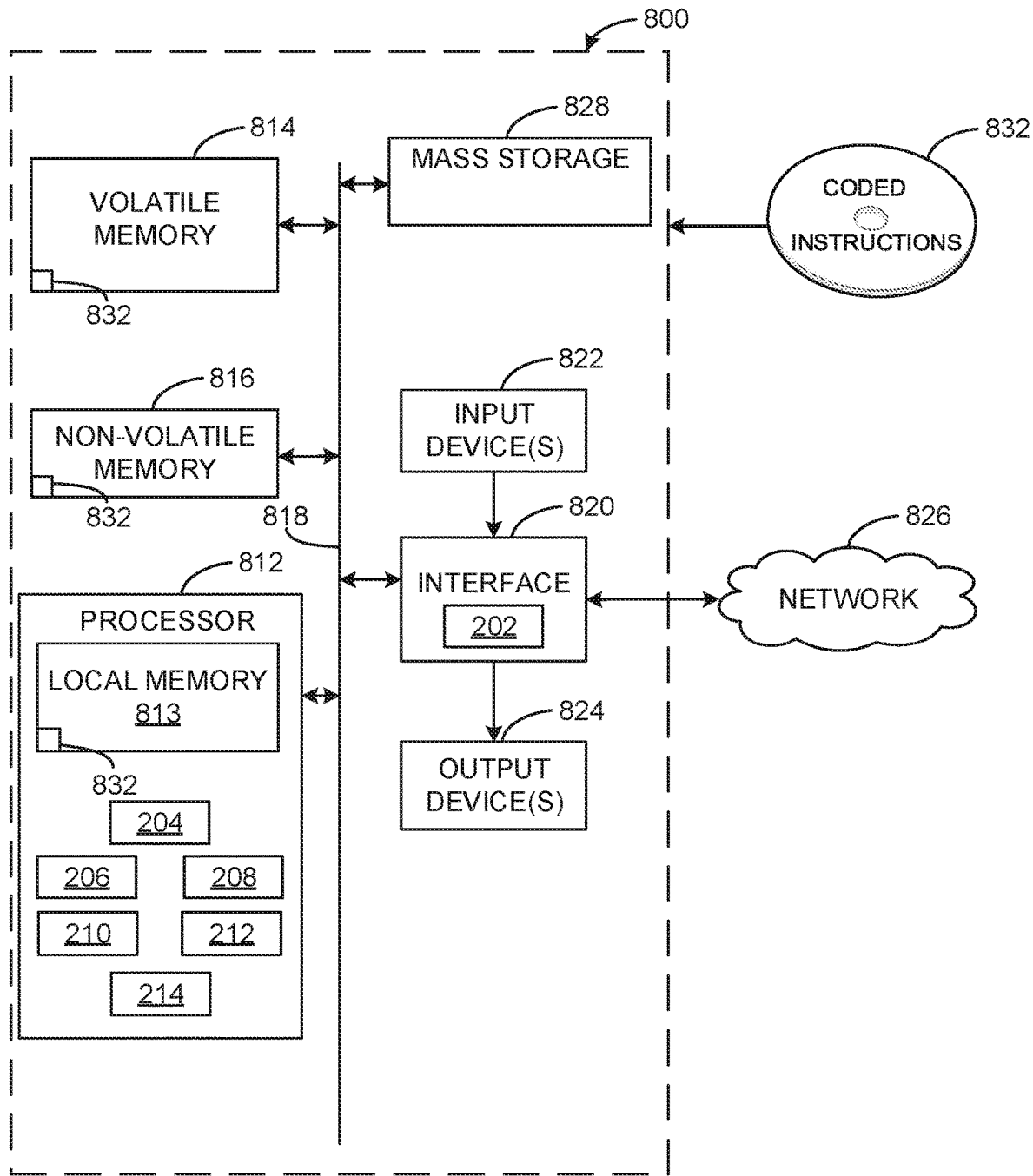
FIG. 8 is an example processor platform diagram to execute the instructions of FIG. 5-7 to implement the example audience monitor of FIGS. 1 and/or 2.

FIG. 8 is a block diagram of an example processor platform 800 structured to execute the instructions of FIGS. 5-7 to implement the monitor 102 of FIGS. 1-2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example network interface 202, the example impression logger 204, the example database interface 206, the example data comparator 208, the example neural network trainer 210, the example neural network 212, and the example targeted media selector 214 of FIG. 2

The processor 812 of the illustrated example includes a local memory 813 (e.g., a cache). In FIG. 8, the example local memory 813 implements the example local memory 306. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface. In the example of FIG. 8, the interface 820 implements the example network interface 202.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

Machine executable instructions 832 represented by FIGS. 5-7 may be stored in the mass storage device 828, in the volatile memory 814, in the non-volatile memory 816, and/or on a removable non-transitory computer readable storage medium such as a CD or DVD.

From the foregoing, it will be appreciated that the above disclosed methods, apparatus, and articles of manufacture network-based monitoring and serving of media to in-vehicle occupants. Example disclosed herein are able to determine demographics from telemetry data of vehicles that do not include demographic information utilizing a trained neural network. Accordingly, examples disclosed herein utilize the trained neural network to identify demographic information of occupants of vehicles that is not available and/or is able to correct demographic information that is inaccurate. Additionally, examples disclosed herein use the estimated demographics to generate targeted media to provide to the occupants of a vehicle that generated the telemetry data. In this manner, the media that is presented to occupants is relevant to the occupants.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a comparator to link media exposure data corresponding to a panelist to first telemetry data collected by a first vehicle corresponding to the panelist to create linked panelist-telemetry data; and
a neural network trainer to train a neural network to estimate vehicle occupant demographics based on second telemetry data collected by a second vehicle, the neural network trainer to train the neural network using a first subgroup of the linked panelist-telemetry data.

2. The apparatus of claim 1, wherein the neural network trainer, when an accuracy of the neural network is below a threshold, uses a second subgroup of the linked panelist-telemetry data to further train the neural network.

3. The apparatus of claim 1, further including:
a targeted media selector to select targeted media for a vehicle occupant based on the estimated demographics; and
an interface to transmit the targeted media to at least one of an infotainment system of the second vehicle or a mobile device of the vehicle occupant.

4. The apparatus of claim 3, wherein the interface transmits the targeted media to the mobile device via the infotainment system of the second vehicle.

5. The apparatus of claim 4, wherein the interface transmits the targeted media to the infotainment system via a server corresponding to the second vehicle.

6. The apparatus of claim 1, wherein the comparator links the media exposure data to the first telemetry data by finding first media exposure data corresponding to the panelist that matches second media exposure data from the first telemetry data.

7. The apparatus of claim 1, wherein the media exposure data is collected using a meter of the panelist.

8. The apparatus of claim 1, wherein the media exposure data includes first demographics of the panelist, the neural network trainer to train the neural network by training the neural network to generate probability values indicative of second demographics of panelists based on corresponding telemetry data.

9. The apparatus of claim 1, wherein the comparator links the linked panelist-telemetry data to reference data corresponding to the first vehicle to create linked panelist-telemetry-reference data, the neural network trainer to train the neural network based on second reference data using the first subgroup of the linked panelist-telemetry-reference data.

10. The apparatus of claim 9, wherein:
the first telemetry data includes at least one of a make of the first vehicle, a model of the first vehicle, media presented by the first vehicle, or a location of the first vehicle; and
the reference data includes at least one of the make of the first vehicle, the model of the first vehicle, an estimated demographic of a person linked to the first vehicle, or a home address of the person linked to the first vehicle.

11. A non-transitory computer-readable storage medium, having instructions that, upon execution, by a processor, cause performance of a set of operations comprising:
linking media exposure data to first telemetry data to create linked panelist-telemetry data, the media exposure data corresponding to a panelist, the first telemetry data collected by a first vehicle corresponding to the panelist; and
train a neural network to estimate vehicle occupant demographics based on second telemetry data collected by a second vehicle, the neural network trained using a first subgroup of the linked panelist-telemetry data.

12. The non-transitory computer-readable storage medium of claim 11, the set of operations further comprising: using, when an accuracy of the neural network is below a threshold, a second subgroup of the linked panelist-telemetry data to further train the neural network.

13. The The non-transitory computer-readable storage medium of claim 11, the set of operations further comprising:
selecting targeted media for a vehicle occupant based on the estimated demographics; and
transmitting the targeted media to at least one of an infotainment system of the second vehicle or a mobile device of the vehicle occupant.

14. The The non-transitory computer readable storage medium of claim 13, the set of operations further comprising: transmitting the targeted media to the mobile device via the infotainment system of the second vehicle.

15. The The non-transitory computer-readable storage medium of claim 14 the set of operations further comprising: transmitting, the targeted media to the infotainment system via a server corresponding to the second vehicle.

16. The The non-transitory computer-readable storage medium of claim 11, linking the media exposure data to the first telemetry data by finding first media exposure data corresponding to the panelist that matches second media exposure data from the first telemetry data.

17. The The non-transitory computer-readable storage medium of claim 11, wherein the media exposure data is collected using a meter of the panelist.

18. A method comprising:
linking, by executing an instruction with a processor, media exposure data corresponding to a panelist to first telemetry data collected by a first vehicle corresponding to the panelist to create linked panelist-telemetry data; and
training, by executing an instruction with the processor, a neural network to estimate vehicle occupant demographics based on second telemetry data collected by a second vehicle, the neural network trained using a first subgroup of the linked panelist-telemetry data.

19. The The non-transitory computer-readable storage medium of claim 11, wherein the media exposure data includes first demographics of the panelist; and where the set of operations further comprises training the neural network by training the neural network to generate probability values indicative of second demographics of panelists based on corresponding telemetry data.

20. The The non-transitory computer-readable storage medium of claim 11, the set of operations further comprising:
linking the linked panelist-telemetry data to reference data corresponding to the first vehicle to create linked panelist-telemetry-reference data; and
training the neural network based on second reference data using the first subgroup of the linked panelist-telemetry-reference data.

21. The non-transitory computer-readable storage medium of claim 20, wherein:
the first telemetry data includes at least one of a make of the first vehicle, a model of the first vehicle, media presented by the first vehicle, or a location of the first vehicle; and
the reference data includes at least one of the make of the first vehicle, the model of the first vehicle, an estimated demographic of a person linked to the first vehicle, or a home address of the person linked to the first vehicle.

22. The method of claim 18, further including, when an accuracy of the neural network is below a threshold, using a second subgroup of the linked panelist-telemetry data to further train the neural network.

23. The method of claim 18, further including:
selecting targeted media for a vehicle occupant based on the estimated demographics; and
transmitting the targeted media to at least one of an infotainment system of the second vehicle or a mobile device of the vehicle occupant.

24. The method of claim 23, wherein the targeted media is transmitted to the mobile device via the infotainment system of the second vehicle.

25. The method of claim 24, wherein the targeted media is transmitted to the infotainment system via a server corresponding to the second vehicle.

26. The method of claim 18, wherein the linking of the media exposure data to the first telemetry data includes finding first media exposure data corresponding to the panelist that matches second media exposure data from the first telemetry data.

27. The method of claim 18, wherein the media exposure data is collected using a meter of the panelist.

28. The method of claim 18, wherein the media exposure data includes first demographics of the panelist, and the training of the neural network includes training the neural network to generate probability values indicative of second demographics of panelists based on corresponding telemetry data.

29. The method of claim 18, further including linking the linked panelist-telemetry data to reference data corresponding to the first vehicle to create linked panelist-telemetry-reference data, the training of the neural network based on second reference data using the first subgroup of the linked panelist-telemetry-reference data.

30. The method of claim 29, wherein:
the first telemetry data includes at least one of a make of the first vehicle, a model of the first vehicle, media presented by the first vehicle, or a location of the first vehicle; and
the reference data includes at least one of the make of the first vehicle, the model of the first vehicle, an estimated demographic of a person linked to the first vehicle, or a home address of the person linked to the first vehicle.

31. A computing system comprising:
creating linked panelist-telemetry data by linking media exposure data corresponding to a panelist to first telemetry data collected by a first vehicle corresponding to the panelist; and
training a neural network to estimate vehicle occupant demographics based on second telemetry data collected by a second vehicle, the neural network trained using a first subgroup of the linked panelist-telemetry data.

32. The computing system of claim 31, the set of operations further comprising:
using, when an accuracy of the neural network is below a threshold, a second subgroup of the linked panelist-telemetry data to further train the neural network.

33. The computing system of claim 31, the set of operations further comprising:
selecting targeted media for a vehicle occupant based on the estimated demographics; and
transmitting the targeted media to at least one of an infotainment system of the second vehicle or a mobile device of the vehicle occupant.

34. The computing system of claim 33, the set of operations further comprising:
transmitting the targeted media to the mobile device via the infotainment system of the second vehicle.

35. The computing system of claim 34, the set of operations further comprising:
transmitting the targeted media to the infotainment system via a server corresponding to the second vehicle.

36. The computing system of claim 31, the set of operations further comprising:
linking the media exposure data to the first telemetry data by finding first media exposure data corresponding to the panelist that matches second media exposure data from the first telemetry data.

37. The computing system of claim 31, wherein the media exposure data is collected using a meter of the panelist.

38. The computing system of claim 31, wherein the media exposure data includes first demographics of the panelist; training the neural network by training the neural network to generate probability values indicative of second demographics of panelists based on corresponding telemetry data.

39. The computing system of claim 31, the set of operations further comprising:
linking the linked panelist-telemetry data to reference data corresponding to the first vehicle to create linked panelist-telemetry-reference data; and
training the neural network based on second reference data using the first subgroup of the linked panelist-telemetry-reference data.

40. The computing system of claim 39, wherein:
the first telemetry data includes at least one of a make of the first vehicle, a model of the first vehicle, media presented by the first vehicle, or a location of the first vehicle; and
the reference data includes at least one of the make of the first vehicle, the model of the first vehicle, an estimated demographic of a person linked to the first vehicle, or a home address of the person linked to the first vehicle.

* * * * *